US009399401B2

(12) United States Patent
Lee et al.

(10) Patent No.: US 9,399,401 B2
(45) Date of Patent: Jul. 26, 2016

(54) BATTERY CHARGING APPARATUS FOR ELECTRIC VEHICLE

(75) Inventors: Jun-Young Lee, Yongin-si (KR); Su-Young Yun, Yaesan-gun (KR); Kyoung-Dong Kim, Yeongi-gun (KR)

(73) Assignee: Myongji University Industry and Academia Cooperation Foundation, Gyeonggi-Do (KR)

(*) Notice: Subject to any disclaimer, the term of this patent is extended or adjusted under 35 U.S.C. 154(b) by 241 days.

(21) Appl. No.: 14/113,377

(22) PCT Filed: Mar. 27, 2012

(86) PCT No.: PCT/KR2012/002198
§ 371 (c)(1),
(2), (4) Date: Oct. 22, 2013

(87) PCT Pub. No.: WO2012/141434
PCT Pub. Date: Oct. 18, 2012

(65) Prior Publication Data
US 2014/0049219 A1    Feb. 20, 2014

(30) Foreign Application Priority Data

Apr. 11, 2011   (KR) .................. 10-2011-0033269

(51) Int. Cl.
| H02J 7/00 | (2006.01) |
| B60L 11/18 | (2006.01) |
| H02J 7/02 | (2016.01) |
| B60L 11/00 | (2006.01) |

(52) U.S. Cl.
CPC ........... *B60L 11/1812* (2013.01); *B60L 11/005* (2013.01); *B60L 11/1816* (2013.01); *H02J 7/0052* (2013.01); *H02J 7/022* (2013.01); *B60L 2210/10* (2013.01); *B60L 2210/30* (2013.01); *B60L 2270/147* (2013.01); *Y02T 10/7005* (2013.01); *Y02T 10/7022* (2013.01); *Y02T 10/7072* (2013.01); *Y02T 10/7216* (2013.01); *Y02T 10/7241* (2013.01); *Y02T 90/127* (2013.01); *Y02T 90/14* (2013.01)

(58) Field of Classification Search
CPC ........................................................ H02J 7/00
USPC ................................................ 320/108, 109
See application file for complete search history.

(56) References Cited

FOREIGN PATENT DOCUMENTS

| JP | 2010-206883 A | | 9/2010 | |
| JP | 2010206883 | * | 9/2010 | ............... H02J 7/00 |
| KR | 10-2002-0054755 A | | 7/2002 | |
| KR | 1020020054755 | * | 7/2002 | ............... H02J 7/10 |
| KR | 10-2011-0029798 A | | 3/2011 | |
| KR | 1020110029798 | * | 3/2011 | ............... H02J 9/00 |

* cited by examiner

*Primary Examiner* — Edward Tso
*Assistant Examiner* — Ahmed Omar
(74) *Attorney, Agent, or Firm* — TechLaw LLP

(57) ABSTRACT

A battery charging apparatus for an electric vehicle includes a first converter part configured to convert a first voltage, which is inputted with rectification, into a second voltage; and a second converter part configured to output a third voltage for charging a battery for the electric vehicle by converting the second voltage into a direct current. The output end of the first converter part comprises a first and a second output terminal. The second converter part comprises a first switching element connected with the first output terminal; a second switching element connected with the second output terminal; a first output capacitor serially connected with the first switching element; and a second output capacitor serially connected with the second switching element. The time during which the first switching element is turned on does not overlap the time during which the second switching element is turned on.

9 Claims, 3 Drawing Sheets

BATTERY CHARGING APPARATUS FOR ELECTRIC VEHICLE

CROSS-REFERENCE TO RELATED APPLICATIONS

This application is a National Phase application of PCT International Application No. PCT/KR2012/002198, which was filed on Mar. 27, 2012, and which claims priority from Korean Patent Application No. 10-2011-0033269, filed with the Korean Intellectual Property Office on Apr. 11, 2011. The disclosures of the above patent applications are incorporated herein by reference in their entirety.

BACKGROUND

1. Technical Field

The embodiments of the present invention relate to a battery charging apparatus for an electric vehicle, more particularly to a battery charging apparatus for an electric vehicle that can be implemented in a smaller size and with a longer lifespan.

2. Description of the Related Art

In general, a battery charging apparatus for an electric vehicle (EV) utilizes a commercial power source. In order to charge batteries of various specifications, a battery charging apparatus for an electric vehicle should be capable of outputting a voltage of 100 to 500 V.

For this purpose, a conventional battery charging apparatus for an electrical vehicle may be divided into a front end for performing power factor correction and a back end for performing current regulation, with the back end in particular utilizing a boost converter.

However, the conventional battery charging apparatus for an electrical vehicle described above may entail the drawback of having to maintain the link voltage at or below the output voltage, because of which the internal composition may have to be changed depending on the magnitude of the input voltage.

Also, the conventional battery charging apparatus for an electrical vehicle may regulate the current flowing to the internal inductor by using a CCM (continuous current mode) regulation technique, which may require the use of a controller having a complicated structure.

Furthermore, the conventional battery charging apparatus for an electrical vehicle may use an electrolytic capacitor to obtain a broad output range, but this may entail the drawbacks of increased size and weight of the battery charging apparatus and may not guarantee a sufficiently long lifespan.

SUMMARY

To resolve the problems described above, an aspect of the invention aims to provide a battery charging apparatus for an electrical vehicle that can be implemented in a smaller size and can ensure a long lifespan.

Other objectives of the present invention can be derived by those skilled in the art from the embodiments described below.

To achieve the objective above, an embodiment of the invention provides a battery charging apparatus for an electric vehicle that includes a first converter part configured to convert a first voltage, which is inputted with rectification, into a second voltage; and a second converter part configured to output a third voltage for charging a battery for the electric vehicle by converting the second voltage into a direct current.

Here, the output end of the first converter part comprises a first output terminal and a second output terminal. The second converter part comprises a first switching element having one end connected with the first output terminal; a second switching element having one end connected with the second output terminal; a first output capacitor having one end serially connected with the other end of the first switching element; and a second output capacitor having one end serially connected with the other end of the second switching element. The first switching element and the second switching element are turned on/off, where the time during which the first switching element is turned on does not overlap the time during which the second switching element is turned on.

Another embodiment of the invention provides a battery charging apparatus for an electric vehicle that includes a first converter part configured to boost a first voltage, which is inputted with full-wave rectification, and convert the first voltage to a second voltage; and a second converter part configured to output a third voltage for charging a battery for the electric vehicle by converting the second voltage into a direct current. Here, the output end of the first converter part comprises a first output terminal and a second output terminal. In order to perform a power factor correction (PFC) function and an amplification function simultaneously, the second converter part comprises: a first switching element having one end connected with the first output terminal; a second switching element having one end connected with the second output terminal; a first output capacitor having one end connected with the other end of the first switching element; a second output capacitor having one end connected with the other end of the second switching element; a first inductor having one end parallel connected with the first output capacitor with respect to a third node, to which the other end of the first switching element and one end of the first output capacitor are connected; and a second inductor having one end parallel connected with the second output capacitor with respect to a fourth node, to which the other end of the second switching element and one end of the second output capacitor are connected.

The battery charging apparatus for an electric car, according to certain embodiments of the invention, can provide the advantages of smaller sizes and longer lifespans.

Also, the battery charging apparatus for an electric car, according to certain embodiments of the invention, can provide the advantage of allowing current regulation by using a controller that has a simpler structure.

Additional aspects and advantages of the present invention will be set forth in part in the description which follows, and in part will be obvious from the description, or may be learned by practice of the invention.

DETAILED DESCRIPTION

Figure 1:
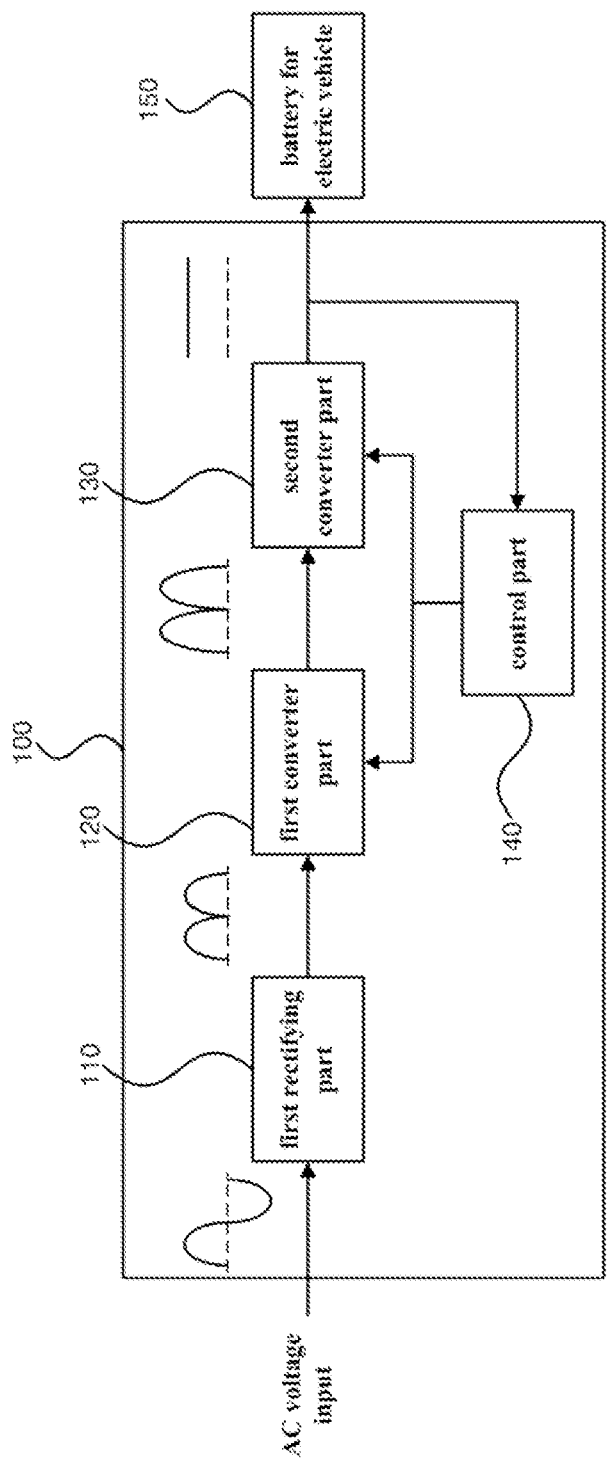
FIG. 1 is a block diagram schematically illustrating the composition of a battery charging apparatus for an electric vehicle according to an embodiment of the invention.

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, like reference numerals are used for like elements.

Certain embodiments of the invention will be described below in more detail with reference to the accompanying drawings.

Figure 2:
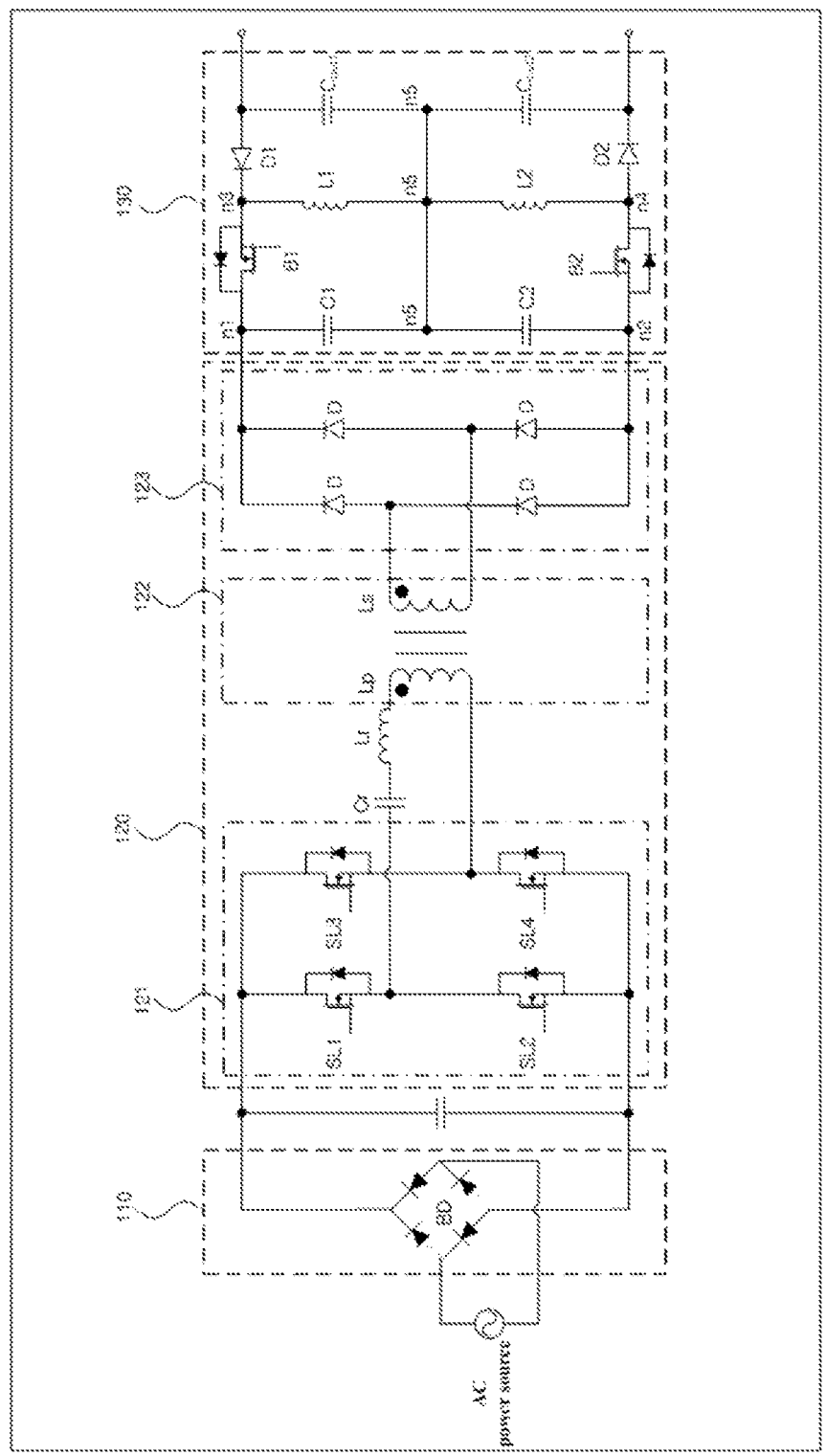
FIG. 2 is a circuit diagram illustrating the detailed composition of a battery charging apparatus for an electric vehicle according to an embodiment of the invention.

FIG. 1 is a block diagram schematically illustrating the composition of a battery charging apparatus for an electric vehicle according to an embodiment of the invention, and FIG. 2 is a circuit diagram illustrating the detailed composition of a battery charging apparatus for an electric vehicle according to an embodiment of the invention.

Referring to FIG. 1 and FIG. 2, a battery charging apparatus 100 for an electrical vehicle according to an embodiment of the invention can include a first rectifying part 110, a first converter part 120, a second converter part 130, and a control part 140. The function of each component is described below in more detail.

The first rectifying part 110 may generate a first voltage by applying half-wave or full-wave rectification on an alternating current voltage inputted from the outside. Here, the inputted AC voltage can have a magnitude greater than or equal to 90 Vac and smaller than or equal to 260 Vac. For instance, the inputted AC voltage can be a commercial AC voltage having a magnitude of 110 Vac or 220 Vac.

According to an embodiment of the invention, the first rectifying part 110 can be connected with an external power source, as illustrated in FIG. 2, and can include four diodes that are connected in a full bridge form.

The first converter part 120 may convert the first voltage into a second voltage by boosting the first voltage that is inputted after the full-wave rectification by the first rectifying part 110. In one example, the first converter part 120 can have the composition of an LLC converter, as illustrated in FIG. 2.

To be more specific, the first converter part 120 can include a switching part 121 that is connected with the first rectifying part 110 to be inputted with the first voltage, a transformer part 122 that is connected with the switching part 121 to perform a boosting operation, and a second rectifying part 123 that is connected with the transformer part 122 to generate and output the second voltage by rectifying the voltage obtained as a result of the boosting operation.

The switching part 121 can be connected to two output terminals of the first rectifying part 110 and can include four switching elements SL1, SL2, SL3, SL4 that are connected in a full bridge form. For the sake of convenience, the four switching elements included in the switching part 121 will hereinafter be referred to as the "third switching element SL1", "fourth switching element SL2", "fifth switching element SL3", and "sixth switching element SL4" (the first switching element and second switching element are included in a second converter part 130, which will be described later on).

In one example, the four switching elements SL1, SL2, SL3, SL4 may each be composed of a transistor (e.g. a FET) and a diode that has its input end connected with a second conductive electrode (e.g. a drain electrode) and its output end connected with a first conductive electrode (e.g. a source electrode) of the transistor.

The third switching element SL1, fourth switching element SL2, fifth switching element SL3, and sixth switching element SL4 can each be cyclically turned on/off. For the sake of convenience, the cycle by which the switching elements SL1, SL2, SL3, SL4 are turned on/off will hereinafter be referred to as the "second cycle" (The "first cycle" refers to the on/off cycle of the first switching element and second switching element included in the second converter part 130 described later on).

To be more specific, the third switching element SL1 and the sixth switching element SL4, which is positioned in a diagonal direction, may be turned on/off simultaneously, and the fourth switching element SL2 and the fifth switching element SL3, which is positioned in a diagonal direction, may be turned on/off simultaneously. Also, the time during which the third switching element SL1 and the sixth switching element SL4 are turned on may not overlap the time during which the fourth switching element SL2 and the fifth switching element SL3 are turned on.

In this case, within the second cycle, the duration of being in an on state and the duration of being in an off state for the third switching element SL1, fourth switching element SL2, fifth switching element SL3, and sixth switching element SL4 can be the same.

The turning on/off of the switching part 121 can be controlled based on control signals generated at the control part 140 (not shown in FIG. 2). The control part 140 can receive as feedback a third voltage outputted from the second converter part 130 and can generate the control signals by using the feedback third voltage. The generated control signals can be inputted to the control electrodes (e.g. gate electrodes) of the transistors (e.g. FET's) included in the switching elements SL1, SL2, SL3, SL4, and the on/off states of the switching elements SL1, SL2, SL3, SL4 can be controlled accordingly.

Next, the transformer part 122 may be connected with the switching part 121 and may boost the voltage outputted from the switching part 121. For this purpose, the number of turns of the secondary winding can be greater than the number of turns of the primary winding in the transformer part 122. In one example, the winding turns ratio of the transformer part 122 can be 1:1.5.

Lastly, the second rectifying part 123 may be connected with the transformer part 122 and may generate and output the second voltage by rectifying the voltage outputted from the transformer part 122.

According to an embodiment of the invention, the second rectifying part 123 can include four diodes that are connected in a full bridge form, as illustrated in FIG. 2.

The second converter part 130 connected with the output end of the second rectifying part 123 (i.e. the output end of the first converter part 120) may convert the second voltage into a direct current and convert this into a third voltage, the third voltage outputted for charging the battery 150 of an electric vehicle.

In one example, the second converter part 130 can take the form of a buck-boost converter having a parallel structure, such as that illustrated in FIG. 2.

More specifically, the second converter part 130 can include a first capacitor C1, a second capacitor C2, a first switching element B1, a second switching element B2, a first inductor L1, a second inductor L2, a first diode D1, a second diode D2, a first output capacitor Cout1, and a second output capacitor Cout2. The connection relationships of each component are described below in more detail.

The first switching element B1 may have one end connected with a first output terminal of the first converter part 120 (i.e. first node n1), while the second switching element B2 may have one end connected with a second output terminal of the first converter part 120 (i.e. second node n2). Here, the second switching element B2 can be regarded as being connected in parallel with the first switching element B1 with respect to the first node n1.

Also, the other end of the first switching element B1 may be serially connected through the first diode D1 with one end of the first output capacitor Cout1. That is, the other end of the first switching element B1 may be connected with the output end of the first diode D1 at a third node n3, and the input end of the first diode D1 may be connected with one end of the first output capacitor Cout1.

Similarly, the other end of the second switching element B2 may be connected through the second diode D2 with the other end of the second output capacitor Cout2. That is, the other end of the second switching element B2 may be connected with the output end of the second diode D2 at a fourth node n4, and the input end of the second diode D2 may be connected with one end of the second output capacitor Cout2.

The first inductor L1 may be parallel connected with the first diode D1 and the first output capacitor Cout1 with respect to the third node n3, and the second inductor L2 may be parallel connected with the second diode D2 and the second output capacitor Cout2 with respect to the fourth node n4.

Also, the first capacitor C1 may have one end connected in parallel with the first switching element B1 with respect to the first node n1, and the second capacitor C2 may be connected in parallel with the second switching element B2 with respect to the second node n2.

Also, the other end of the first output capacitor Cout1, the other end of the second output capacitor Cout2, the other end of the first inductor L1, the other end of the second inductor L2, the other end of the first capacitor C1, and the other end of the second capacitor C2 may be connected to one another at a fifth node n5.

The first switching element B1 and the second switching element B2 can each be composed of a transistor (e.g. a FET) and a diode having its input end connected with a second conductive electrode (e.g. a drain electrode) and its output end connected with a first conductive electrode (e.g. a source electrode) of the transistor, similar to the third switching element SL1, fourth switching element SL2, fifth switching element SL3, and sixth switching element SL4 described above.

Also, the first switching element B1 and the second switching element B2 can be cyclically turned on/off according to a particular cycle (i.e. a first cycle), similar to the third switching element SL1, fourth switching element SL2, fifth switching element SL3, and sixth switching element SL4 described above.

To be more specific, according to an embodiment of the invention, the first switching element B1 and the second switching element B2 can be turned on/off such that the times of their being in an on state do not overlap. In this case, the on/off cycle of the first switching element B1 and the on/off cycle of the second switching element B2 can be the same (the first cycle), and the starting point at which the first switching element is turned on can differ from the starting point at which the second switching element is turned on by ½ of the first cycle.

Also, according to another embodiment of the invention, the first switching element B1 and the second switching element B2 can be turned on/off simultaneously.

In the two embodiments above, within the first cycle, the duration of the first switching element B1 and the second switching element B2 being in an on state can be adjustable within a range of being shorter than or equal to the duration of the first switching element B1 and the second switching element B2 being in an off state.

The on/off states of the first switching element B1 and second switching element B2 can be controlled based on control signals generated at the control part 140, similar to the examples described above. That is, the control part 140 can generate control signals by using the third voltage received as feedback, and the control signals thus generated can be inputted to the control electrodes (e.g. gate electrodes) of the transistors (e.g. FET's) included in the first switching element B1, second switching element B2, third switching element SL1, fourth switching element SL2, fifth switching element SL3, and sixth switching element SL4.

Figure 3:
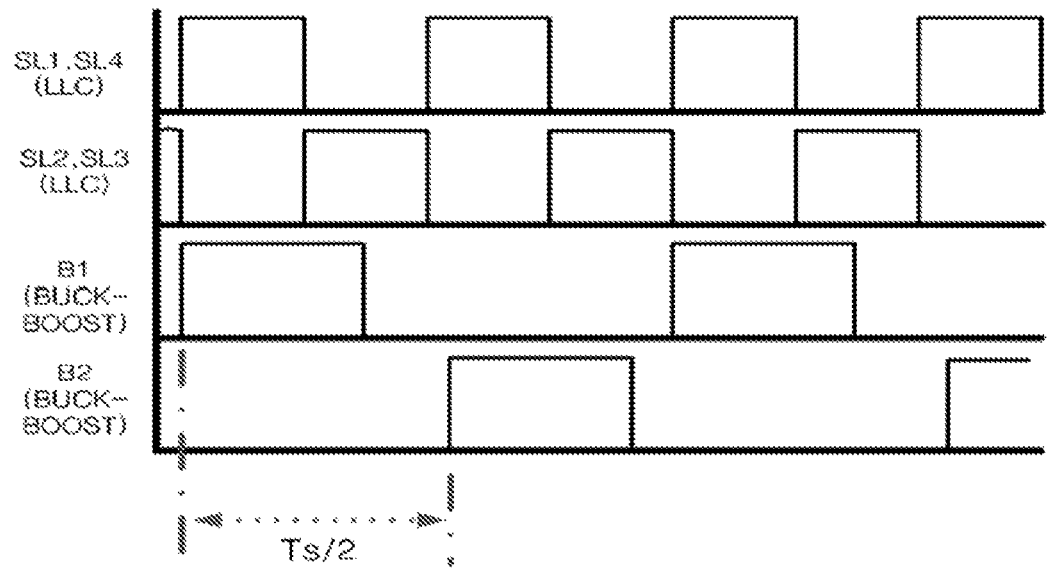
FIG. 3 and FIG. 4 show examples of control signals generated at the control part for controlling the switching of a first switching element B1, second switching element B2, third switching element SL1, fourth switching element SL2, fifth switching element SL3, and sixth switching element SL4.
Figure 4:
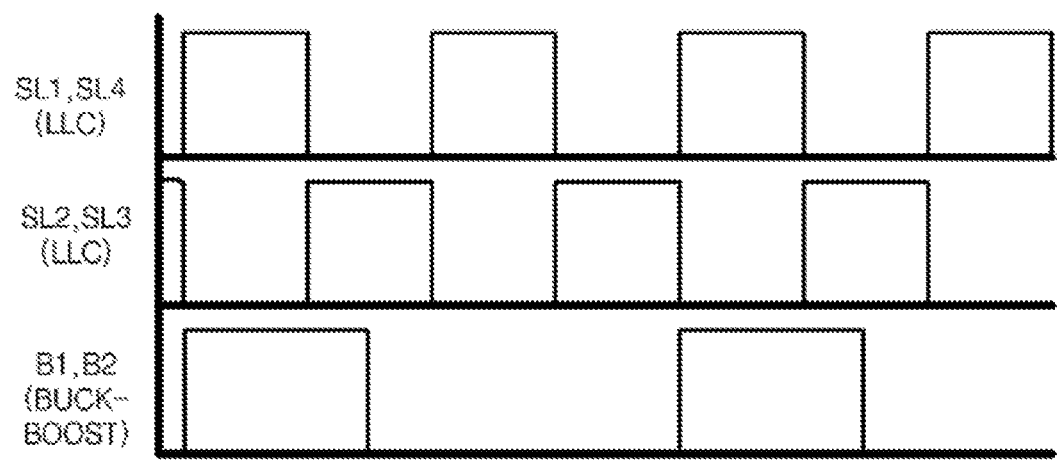

FIG. 3 and FIG. 4 show examples of control signals generated at the control part 140 for controlling the switching of the first switching element B1, second switching element B2, third switching element SL1, fourth switching element SL2, fifth switching element SL3, and sixth switching element SL4.

First, if the control signals shown in the upper portion of FIG. 3 are inputted to the control electrodes of the third switching element SL1, fourth switching element SL2, fifth switching element SL3, and sixth switching element SL4, then at the point when the third/sixth switching elements SL1/SL4 are turned on, the fourth/fifth switching elements SL2/SL3 may be turned off, and at the point when the third/sixth switching elements SL1/SL4 are turned off, the fourth/fifth switching elements SL2/SL3 may be turned on. That is, the third/sixth switching elements SL1/SL4 and the fourth/fifth switching elements SL2/SL3 may be turned on/off according to a fixed duty cycle.

Also, if the control signal shown in the lower portion of FIG. 3 are inputted to the control electrodes of the first switching element B1 and the second switching element B2, then, as described above, the first switching element B1 and the second switching element B2 may not be turned on simultaneously, and instead, the duration of the first switching element B1 and the second switching element B2 being turned on within the first cycle may be shorter than or equal to the duration of the first switching element B1 and the second switching element B2 being turned off, with the starting point at which the first switching element B1 is turned on differing from the starting point at which the second switching element B2 is turned on by ½ of the first cycle. Here, the duration of the first/second switching elements B1/B2 being turned on can be freely adjusted within the range of being shorter than or equal to the duration of the first/second switching elements B1/B2 being turned off. That is, the first switching element B1 and the second switching element B2 can be turned on/off according to an arbitrary duty cycle, and the duty cycle can be variable.

Also, comparing the on/off cycles for the first/second switching elements B1/B2 and the third to sixth switching elements SL1 to SL4, the first cycle may be twice as long as the second cycle, and the starting point at which the first switching element B1 is turned on may be the same as the starting point at which the third/sixth switching elements SL1/SL4 are turned on.

Next, if the control signals shown in FIG. 4 are inputted, then the third to sixth switching elements SL1 to SL4 may be turned on/off in the same manner as described above for FIG. 3. Also, the first switching element B1 and the second switching element B2 may be turned on/off simultaneously. Here, the duration of the first/second switching elements B1/B2 being turned on can be freely adjusted within a range of being shorter than or equal to the duration of the first/second switching elements B1/B2 being turned off. That is, the first switching element B1 and the second switching element B2 can be turned on/off according to an arbitrary duty cycle, and the duty cycle can be variable.

Also, comparing the on/off cycles for the first/second switching elements B1/B2 and the third to sixth switching elements SL1 to SL4, the first cycle may be twice as long as the second cycle, and the starting point at which the first switching element B1 is turned on may be the same as the starting point at which the third/sixth switching elements SL1/SL4 are turned on.

When the control signals such as the above are inputted, the second converter part 130 may be controlled in a discontinuous current mode (DCM). Accordingly, the second converter part 130 can be controlled by using a controller 140 having a simpler structure compared to the cases of being controlled in a continuous current mode (CCM) and a boundary current mode (BCM).

Also, in cases where the first switching element B1 and the second switching element B2 are controlled to be turned on/off alternatingly as described above, the first switching element B1, the first capacitor C1, the first inductor L1, and the first output capacitor Cout1 may form one converting group, while the second switching element B2, the second capacitor C2, the second inductor L2, and the second output capacitor Cout2 may form another converting group. Also, as the two parallel connected converting groups perform the converting in an alternating manner, the voltage stress applied on the elements included in the second converter part 130 can be reduced, and a phase shift can occur to reduce the ripple included in the second voltage.

In cases where the first switching element B1 and the second switching element B2 are controlled to be turned on/off alternatingly as described above, it is possible to arbitrarily adjust the magnitude of the third voltage by adjusting the duty cycle of the first/second switching elements B1/B2, so that various types of batteries for electrical vehicles can be charged regardless of the specifications of the batteries.

Also, if the second converter part 130 is formed as illustrated in FIG. 2, the second converter part 140 can perform power factor correction (PFC) and amplification (i.e. current regulation) simultaneously, making it unnecessary to separately include a circuit for power factor correction at the front end of the first converter part 120.

Furthermore, the second converter part 130, which is a component that is connected directly with the battery 150 for an electrical vehicle, may be inputted with a voltage having an alternating-current waveform, unlike conventional battery charging apparatuses for electrical vehicles, so that the first/second output capacitors Cout1/Cout2 can be implemented using low-capacitance film capacitors instead of high-capacitance electrolytic capacitors. When the second converter part 130 is implemented using film capacitors of lower capacitance, the battery charging apparatus for electric vehicles can be given an increased lifespan as well as a smaller size.

While the present invention has been described above using particular examples, including specific elements, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

What is claimed is:

1. A battery charging apparatus for an electric vehicle, the battery charging apparatus comprising:
a first converter part configured to convert a first voltage into a second voltage, the first voltage inputted with rectification; and
a second converter part configured to output a third voltage for charging a battery for the electric vehicle by converting the second voltage into a direct current,
wherein an output end of the first converter part comprises a first output terminal and a second output terminal,
the second converter part comprises a first switching element having one end thereof connected with the first output terminal; a second switching element having one end thereof connected with the second output terminal; a first output capacitor having one end thereof serially connected with the other end of the first switching element; and a second output capacitor having one end thereof serially connected with the other end of the second switching element,
the first converter part includes a switching part having the first voltage inputted thereto, the switching part includes a third switching element, a fourth switching element a fifth switching element, and a sixth switching element,
the first switching element and the second switching element are turned on/off, and a time during which the first switching element is turned on does not overlap a time during which the second switching element is turned on,
an on/off cycle of the first switching element and an on/off cycle of the second switching element are identical as a first cycle, and a starting point of the first switching element being turned on differs from a starting point of the second switching element being turned on by ½ of the first cycle,
a duration of the first switching element and the second switching element being turned on within the first cycle is shorter than or equal to a duration of the first switching element and the second switching element being turned off, a duration of the third switching element, the fourth switching element, the fifth switching element, and the sixth switching element being turned on within the second cycle is equal to a duration of being turned off,
the first cycle is twice as long as the second cycle, and
a starting point of the first switching element being turned on is identical to a starting point of the third switching element and the sixth switching element being turned on.

2. The battery charging apparatus of claim 1, wherein the first output capacitor and the second output capacitor are film capacitors.

3. The battery charging apparatus of claim 1, wherein the second converter part further comprises a first diode having an input end thereof connected with one end of the first output capacitor and an output end thereof connected with the other end of the first switching element; a second diode having an input end thereof connected with the other end of the second switching element and an output end thereof connected with one end of the second output capacitor; a first inductor having one end thereof parallel connected with the first diode with respect to a third node having the other end of the first switching element and the output end of the first diode connected thereto; and a second inductor connected with the second diode with respect to a fourth node having the other end of the second switching element and the input end of the second diode connected thereto,
and the first switching element and the second switching element have a variable duty cycle.

4. The battery charging apparatus of claim 3, wherein the second converter part further comprises a first capacitor having one end thereof parallel connected with the first switching element with respect to a first node having the first output terminal and one end of the switching element connected thereto; and a second capacitor having one end thereof parallel connected with the second switching element with respect to a second node having the second output terminal and one end of the second switching element connected thereto, and the other end of the first output capacitor, the other end of the second output capacitor, the other end of the first inductor, the other end of the second inductor, the other end of the first capacitor, and the other end of the second capacitor are connected to one another at a fifth node.

5. The battery charging apparatus of claim 1, further comprising:

a first rectifying part comprising four diodes connected in a full bridge form, the first rectifying part configured to generate the first voltage by applying full-wave rectification on a commercial alternating voltage.

6. The battery charging apparatus of claim 1, wherein the first converter part comprises:

a transformer part connected with the switching part; and
a second rectifying part connected with the transformer part and configured to output the second voltage.

7. The battery charging apparatus of claim 6, wherein
the third switching element and the sixth switching element positioned in a diagonal direction from the third switching element are turned on/off simultaneously, the fourth switching element and the fifth switching element positioned in a diagonal direction from the fourth switching element are turned on/off simultaneously, a time during which the third switching element is turned on does not overlap a time during which the sixth switching element is turned, a time during which the fourth switching element is turned on does not overlap a time during which the fifth switching element is turned on, and a duty cycle of the third to sixth switching elements is fixed.

8. The battery charging apparatus of claim 7, further comprising:

a control part configured to generate a control signal for controlling a turning on/off and to transmit the control signal to at least one of the first switching element, the second switching element, the third switching element, the fourth switching element, the fifth switching element, and the sixth switching element.

9. The battery charging apparatus of claim 7, wherein at least one of the first switching element, the second switching element, the third switching element, the fourth switching element, the fifth switching element, and the sixth switching element comprises:

a transistor; and
a diode having an input end thereof connected with a second conductive electrode of the transistor and having an output end thereof connected with a first conductive electrode of the transistor.

* * * * *